US010999566B1

(12) United States Patent
Mahyar et al.

(10) Patent No.: US 10,999,566 B1
(45) Date of Patent: May 4, 2021

(54) AUTOMATED GENERATION AND PRESENTATION OF TEXTUAL DESCRIPTIONS OF VIDEO CONTENT

(71) Applicant: Amazon Technologies, Inc., Seattle, WA (US)

(72) Inventors: Hooman Mahyar, Kirkland, WA (US); Vimal Bhat, Redmond, WA (US); Jatin Jain, Redmond, WA (US); Udit Bhatia, Bellevue, WA (US); Roya Hosseini, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/563,485

(22) Filed: Sep. 6, 2019

(51) Int. Cl.
| | |
|---|---|
| *H04N 9/87* | (2006.01) |
| *G06K 9/00* | (2006.01) |
| *G06F 16/738* | (2019.01) |
| *G06N 3/04* | (2006.01) |
| *G06F 16/78* | (2019.01) |
| *G06F 40/166* | (2020.01) |
| *G10L 13/00* | (2006.01) |
| *G10L 17/00* | (2013.01) |

(52) U.S. Cl.
CPC ......... *H04N 9/8715* (2013.01); *G06F 16/738* (2019.01); *G06F 16/7867* (2019.01); *G06F 40/166* (2020.01); *G06K 9/00288* (2013.01); *G06K 9/00718* (2013.01); *G06K 9/00744* (2013.01); *G06N 3/0454* (2013.01); *G10L 13/00* (2013.01); *G10L 17/00* (2013.01); *G06K 2009/00738* (2013.01)

(58) Field of Classification Search
CPC . H04N 9/8715; G06F 16/738; G06F 16/7867; G06F 40/166; G06K 9/00288; G06K 9/00718; G06K 9/00744; G06K 2009/00738; G06N 3/0454; G10L 13/043; G10L 17/005
See application file for complete search history.

(56) References Cited

U.S. PATENT DOCUMENTS

| | | | |
|---|---|---|---|
| 9,836,853 B1 * | 12/2017 | Medioni | G06N 3/0445 |
| 2010/0223140 A1 * | 9/2010 | Bosan | G06Q 30/02 |
| | | | 705/14.64 |
| 2011/0040760 A1 * | 2/2011 | Fleischman | H04N 21/812 |
| | | | 707/737 |

(Continued)

*Primary Examiner* — Thai Q Tran
*Assistant Examiner* — Sunghyoun Park
(74) *Attorney, Agent, or Firm* — Eversheds Sutherland (US) LLP

(57) ABSTRACT

Systems, methods, and computer-readable media are disclosed for systems and methods for automated generation of textual descriptions of video content. Example methods may include determining, by one or more computer processors coupled to memory, a first segment of video content, the first segment including a first set of frames and first audio content, determining, using a first neural network, a first action that occurs in the first set of frames, and determining a first sound present in the first audio content. Some methods may include generating a vector representing the first action and the first sound, and generating, using a second neural network and the vector, a first textual description of the first segment, where the first textual description includes words that describe events of the first segment.

17 Claims, 6 Drawing Sheets

(56) References Cited

U.S. PATENT DOCUMENTS

| | | | |
|---|---|---|---|
| 2013/0063664 A1* | 3/2013 | Corl | H04N 21/84 348/570 |
| 2016/0277802 A1* | 9/2016 | Bernstein | H04N 21/4307 |
| 2017/0132758 A1* | 5/2017 | Paluri | G06T 7/246 |
| 2018/0349496 A1* | 12/2018 | Ptitsyn | G06K 9/00362 |
| 2019/0114487 A1* | 4/2019 | Vijayanarasimhan | G06K 9/00751 |
| 2020/0043511 A1* | 2/2020 | Raikar | G10L 21/043 |

* cited by examiner

AUTOMATED GENERATION AND PRESENTATION OF TEXTUAL DESCRIPTIONS OF VIDEO CONTENT

BACKGROUND

Certain digital content, such as movies, television shows, and other video content may include text data, such as text that may be used for subtitles. Some video content may include text that may be used for closed captions or other textual descriptions of video content. Closed captions may describe audio that is presented in the video content. For example, closed captions may describe music or sounds that occur in the video content. Text data may be used to provide text-based content that improves a user experience. Generating text data, and in particular textual descriptions of video content, may be a time-consuming manual process in some instances. Moreover, not all users may be able to quickly read textual descriptions presented in addition to video content. Accordingly, automated generation and presentation of textual descriptions of video content may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
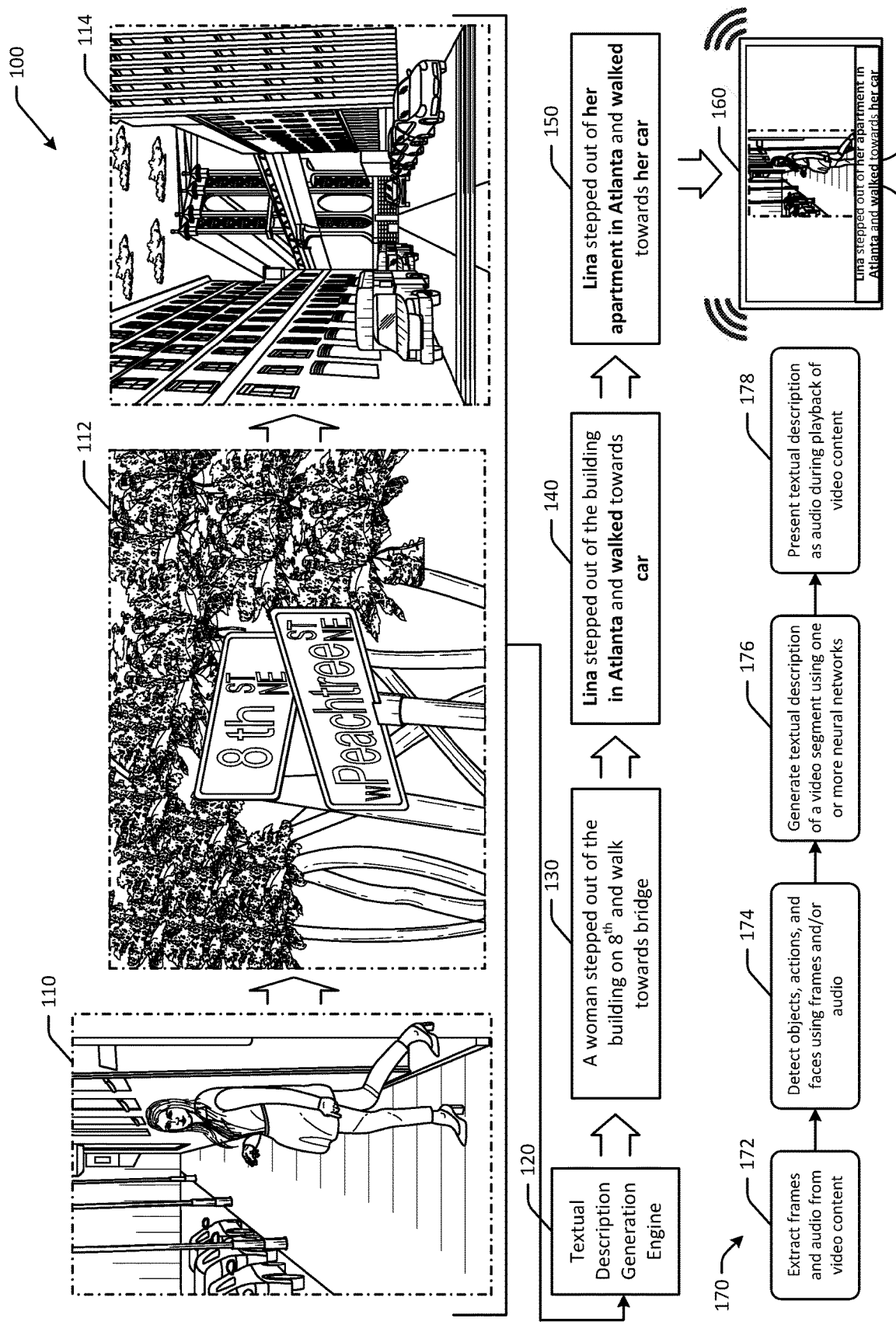
FIG. 1 is a schematic illustration of an example use case for automated generation of textual descriptions of video content in accordance with one or more example embodiments of the disclosure.

Digital content may include video content, such as movies, television shows, streaming shows (e.g., made for Amazon Prime, Netflix, etc.), and other video content. During consumption of digital content, such as video content, users may utilize text data, such as subtitles or caption data, to improve a user experience. For example, subtitles may aid a user in understanding dialog that occurs in the video content, and/or captions may aid a user in understanding audio and/or dialog that occurs in the video content (e.g., music being played, sound effects, etc.).

In some instances, textual descriptions of video content may improve a user experience. For example, a textual description of video may include a description of a scene that occurs in the video content, an action that occurs, objects in a particular scene, and so forth. An example textual description may be "a man using his laptop in a café," or "a woman wearing a red shirt blow drying her hair." Such textual descriptions may correspond to scenes in video content where there is a man using a laptop in a café, or where a woman is blow drying her hair. Textual descriptions may be presented instead of, or in addition to, subtitles, captions, or other text data. Textual descriptions may be presented as text during playback of video content, and/or may optionally be presented as audio in addition to the audio of the video content. For example, during a pause in dialog or in between scenes of the video content, an audible presentation of a textual description of the video content may be presented to the user.

Embodiments of the disclosure include systems and methods to automatically generate textual descriptions for video content. Instead of manual generation of textual descriptions, embodiments of the disclosure may automatically analyze video and/or audio associated with certain content, and generate textual descriptions. Embodiments may determine timing and/or placement of textual descriptions during playback of video content. For example, audible presentation of textual descriptions may be presented during certain time intervals and/or during instances where no dialog occurs in the video content, and textual presentation of textual descriptions may be presented when other text data is not rendered and/or during instances where no dialog-related text data would otherwise be presented (e.g., description of sound effects or music, etc.).

In some embodiments, content may be separated into segments using one or more video processing algorithms, text processing algorithms, and/or audio processing algorithms to identify and/or determine scenes that may take place in various portions of the content. The identified segments may be analyzed to determine textual descriptions of the segments (which may or may not be the entire segment). Textual descriptions may be aggregated, processed for consistency and/or consolidation, and presented in text-based and/or audio-based formats to aid a user in understanding different portions of the video content.

This disclosure relates to, among other things, devices, systems, methods, computer-readable media, techniques, and methodologies for automated generation of textual descriptions of video content. Certain embodiments may automatically generate textual descriptions for digital content, such as video content (e.g., movies, television programs, streaming content, etc.), based at least in part on analysis of individual frames of video content, and/or analysis of audio segments. Certain embodiments determine aspects of video content using neural network(s) and/or machine learning and other methodologies. In some instances, machine learning (e.g., deep neural networks, long short term memory units and/or recurrent neural networks, etc.) may be used to identify various elements of video frames that may be used to generate textual descriptions.

In some embodiments, textual descriptions that are presented in audible format may aid visually impaired users in consuming video content by providing a description of what occurs in the video content. For example, the textual descriptions may describe what is happening on the screen during natural pauses in the audio associated with the video content.

Embodiments of the disclosure may simultaneously generate video and audio descriptions using various functionality, such as one or more of image captioning, object detection, action detection, sound recognition, and/or knowledge graph data. Image captioning may include generating textual descriptions for one or more (or all) frames of video content. Object detection may include the detection of objects that appear in various video frames. Action detection may include the detection of actions that occur across multiple video frames and/or video segments. Sound recognition may include detection of sound effects and other sounds present in audio that corresponds to video content. Knowledge graph data may include data associated with particular video content that includes relationships between characters, events or scenes present in the video content, and so forth. Knowledge graph data may be used to refine textual descriptions to increase accuracy, such as by replacing "a man" with a character name. Knowledge graph data may be independently generated, and may therefore provide an advantage over other image-to-text processing algorithms.

In an example embodiment, a deep neural network may be built to generate a textual description for a single image. Individual textual descriptions may be generated for some or all frames of the video content. The textual descriptions for a scene may be aggregated and reconciled to form a textual description for the scene. Some embodiments may include facial recognition processing, object detection processing, and/or natural language processing models to refine textual descriptions, such as by replacing pronouns or a word associated with gender with character names. Some embodiments may use sound recognition models to detect background music or any other voices that are not present in a subtitle file (e.g., a time-text file, etc.) associated with the video content. For example, when people are talking in the background or when a radio or TV is playing in the background of the video content. Sound information may be used to generate textual descriptions with varying and/or variable levels of granularity. For example, a user may modify a level of granularity desired during playback of the video content. Accordingly, a textual description of "Lee went snowmobiling with his best friends in the mountains as the snow fell and the engines roared" may be modified to "Lee went snowmobiling with his best friends" depending on user selection of granularity settings. Embodiments of the disclosure may therefore reduce manual effort in generating textual descriptions of video content by automatically generating relevant and accurate textual descriptions that were previously unable to be generated by computers due to a lack of mapping of character names and events that occur in video content.

Referring to FIG. 1, an example use case 100 for automated generation of textual descriptions of video content is depicted in accordance with one or more example embodiments of the disclosure. In the example of FIG. 1, video content may include multiple frames, such as a first frame 110, a second frame 112, and a third frame 114. The first frame 110, second frame 112, and third frame 114 may not necessarily be consecutive frames, but may be part of the same scene in the video content. The video frames may be input individually and/or as a video segment into a textual description generation engine 120. The textual description generation engine 120 may include one or more neural networks that may be used to analyze the respective frames and to generate a corresponding textual description. The textual description generation engine 120 may therefore optionally extract the frames from the video content, as well as corresponding audio. Using one or more image processing algorithms, the textual description generation engine 120 may detect or otherwise determine objects that appear in the respective frames, actions that occur in the video segment corresponding to a scene, and/or faces that appear in the frames. The textual description generation engine 120 may analyze the corresponding audio to detect or otherwise determine any sounds present in the audio.

Based at least in part on the analysis of the individual frames, the textual description generation engine 120 may generate a textual description of some or all of the frames. For example, the textual description generation engine 120 may generate textual descriptions of "a woman stepping onto the sidewalk" for the first frame 110, "street signs for $8^{th}$ street and Peachtree street" for the second frame 112, "a street and bridge" for the third frame 114, and so forth. The textual description generation engine 120 may also determine actions that occur during the scene via analysis of the set of frames in sequence. For example, the textual description generation engine 120 may determine an action of "walking" during the scene in which the first frame 110, second frame 112, and third frame 114 appear.

To enhance the textual descriptions, the textual description generation engine 120 may analyze the corresponding audio to determine sounds present in the audio. For example, the textual description generation engine 120 may determine that road noise (e.g., cars honking, people talking, etc.) is present in the corresponding audio. To analyze the audio, the textual description generation engine 120 may separate the audio file into segments and classify detected sounds into categories (e.g., verbal dialog, sound effects, music, etc.). For example, audio may be separated into segments, converted using Fourier transforms, and fed as inputs to a deep neural network for classification.

The textual description generation engine 120 may generate a vector that combines the individual textual descriptions for the frames and the output of the audio analysis. For example, the textual description generation engine 120 may use a first neural network, such as a simple convolutional neural network (e.g., a two-dimensional neural network in some instances), to generate a single vector representing the image and/or audio analysis for the scene or portion of the scene. In some embodiments, multiple vectors may be generated to represent the image and/or audio analysis for the scene or portion of the scene.

The textual description generation engine 120 may input the vector into a second neural network, such as a three-dimensional temporal neural network. The second neural network may output a textual description for the scene or portion of the scene. The second neural network may analyze the individual textual descriptions, aggregate and combine the individual textual descriptions, incorporate analysis of the audio, and output a textual description for the scene and/or segment of video.

For example, in FIG. 1, the textual description generation engine 120 may generate a first textual description 130 of "a woman stepped out of the building on 8$^{th}$ and walk towards bridge." The first textual description 130 may not be perfect with respect to syntax, grammar, and so forth. Accordingly, some embodiments may include post-processing to refine the first textual description 130. For example, embodiments of the disclosure may refine the first textual description 130 by replacing pronouns with character names, replacing generic locations with actual locations, correct grammar, and/or incorporate action data using knowledge graph data associated with the video content.

In the example of FIG. 1, a second textual description 140 may be refined to "Lina stepped out of the building in Atlanta and walked towards her car," where Lina replaces "a woman" as a character name in the video, and contextual data of "in Atlanta" is added. In addition, "walk" is corrected to "walked," and action data is used to correct "bridge" to "car" (e.g., based on action analysis of the scene, the character is determined to be walking to a car and not the bridge that appears in the third frame 114). The second textual description 140 may be further refined for context and correctness. For example, a third textual description 150 may be "Lina stepped out of her apartment in Atlanta and walked towards her car," where "the building" is modified to "her apartment" based on context of the scene and/or story, and "walked towards car" is modified to "walked towards her car" for correct grammar. Although illustrated as two separate iterations of the textual description in the example of FIG. 1, in other embodiments, all of the post processing may be completed in a single iteration.

The third textual description 150 may be presented as the final textual description in textual and/or audio format during playback of the content at a display device 160, as illustrated in FIG. 1. The third textual description 150 may be presented in addition to, or instead of, other text data, and if presented audibly, may be presented during natural pauses in the audio with playback speed determined using a length of the natural pause and a length of the third textual description 150.

As a result, a user consuming the video content may receive textual descriptions that may be presented in visual and/or audio format, and may aid the user in understanding what is happening during the scene or video segment being presented. In addition, users may search for content using descriptions of scenes, as opposed to title or character names. For example, a user can input a search query of "show me the movie where the girl becomes president," and search results may be determined using the textual descriptions of video content to identify movies including such scenes.

To generate textual descriptions of content, an example process flow 170 is presented and may be performed, for example, by one or more textual description generation engines at one or more remote servers. The remote server and/or computer system may include at least one memory that stores computer-executable instructions and at least one processor configured to access the at least one memory and execute the computer-executable instructions to perform various actions or operations, such as one or more of the operations in the process flow 170 of FIG. 1.

At a first block 172, frames and audio may be extracted from video content. For example, the textual description generation engine 120 may extract frames and audio from video content. At a second block 174, objects, actions, and faces may be detected using frames and/or audio. At a third block 176, a textual description of a video segment may be generated using one or more neural networks. At a fourth block 178, the textual description may be presented as audio during playback of video content.

Embodiments of the disclosure may include automated generation of textual descriptions of video content, and may include one or more modules that can be used to analyze digital content. Certain embodiments may use one or more detection modules or algorithms (e.g., object recognition modules, pattern recognition algorithms, etc.) to identify or detect the presence of one or more features in the content. Features may include, for example, the presence of certain objects, the occurrence of certain actions or events, certain sounds in an audio file or audio component of the content, certain language in a text file or text component of the content, and so forth. One or more detection modules may be used to process and/or detect various features in the content. In some instances, a module may perform more than one form of analysis.

Example embodiments of the disclosure provide a number of technical features or technical effects. For example, in accordance with example embodiments of the disclosure, certain embodiments of the disclosure may automatically analyze audio, video, and/or text components of content. Certain embodiments may generate textual descriptions for various scenes of video content. Some embodiments may provide search functionality to locate or identify content that includes certain scenes using written or audible (e.g., speech input) descriptions of scenes. Some embodiments may be configured to generate content summaries for content and enable descriptive searching. Certain embodiments may recognize or identify presence of certain objects and/or presence of certain themes or types of content and may use one or more machine learning modules or algorithms. As a result of improved functionality, textual descriptions of video may be generated. Embodiments of the disclosure may improve computing efficiency by reducing a length of textual descriptions via consolidation of descriptions of individual frames, resulting in reduced file size. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
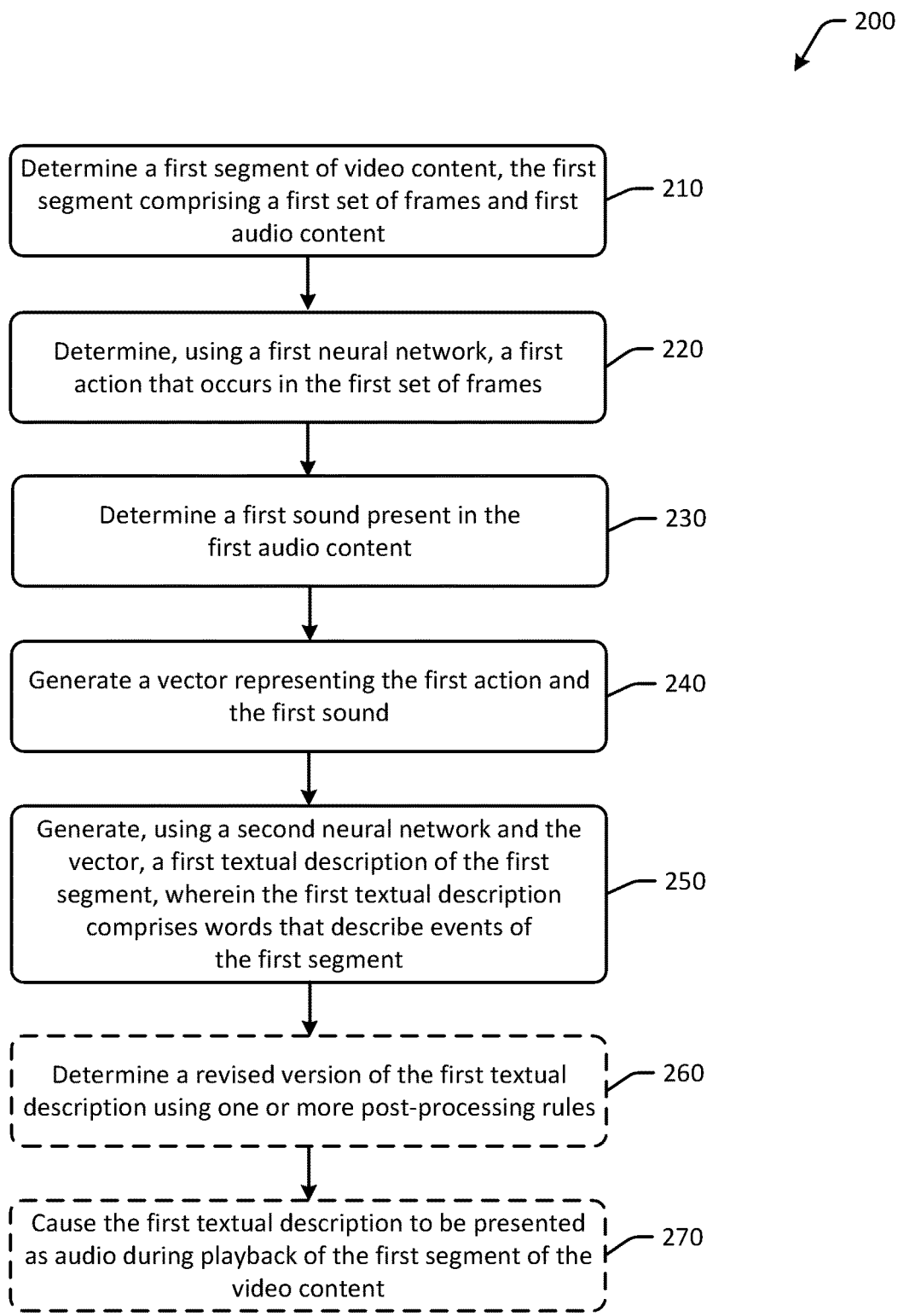
FIG. 2 is a schematic illustration of an example process flow for automated generation of textual descriptions of video content in accordance with one or more example embodiments of the disclosure.

FIG. 2 depicts an example process flow 200 for automated generation of textual descriptions of video content in accordance with one or more example embodiments of the disclosure. While example embodiments of the disclosure may be described in the context of movies or other video content, it should be appreciated that the disclosure is more broadly applicable to any type of digital content. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine a first segment of video content, the first segment comprising a first set of frames and first audio content. For example, a content processing engine and/or one or more video processing modules at a remote server may determine a first segment of video content, the first segment comprising a first set of frames and first audio content. The first segment may be a video segment of video content, and may be associated with text and/or audio components. The first segment may be a continuous segment or non-continuous segments that are related. For example, a scene in the content may be interrupted by a flashback or other scene, and may subsequently resume. Segments may correspond to events, scenes, and/or other occurrences that may be discrete and/or extractable from the content. In some instances, segments may correspond to certain locations and/or times, certain actors that appear, certain music or sounds, and/or other features of the content. For example, the remote server may determine a first clip or a first segment of a movie using content data associated with the movie, such as video analysis data. The first clip may be a continuous portion of the movie corresponding to a first scene of the movie that occurs from a first timestamp to a second timestamp. The content scanning engine of the remote server may determine the respective timestamps for segments. Some segments may have more than one set of start and stop timestamps. For example, a scene may be interrupted and then resume later, in which case there may be more than one pair of start and stop timestamps.

To determine the first segment, the remote server may extract and/or analyze individual frames of video content to determine whether the frames are part of the same segment or a different segment. Analysis of frames may include processing images using one or more object recognition algorithms, determining pixel color values, comparing certain portions of frames to previous or subsequent frames in the video, and the like. In one example, an automobile object recognition algorithm may be used to determine that there is a car present in a first frame of a video. In another example, a firearm detection module or algorithm may be used to determine that gun violence or a firearm is present in a first frame of a video. One or more object recognition algorithms may be used on individual frames or sets of frames in a video. The determined objects or features may be outputs of the respective modules or algorithms.

In some embodiments, the remote server may determine a movie file that includes video data and audio data. The remote server may extract a first video segment from the video data, where the first segment comprising a first frame and a second frame, and first audio content.

At block 220 of the process flow 200, computer-executable instructions stored on a memory of a device, such as a remote server or a user device, may be executed to determine, using a first neural network, a first action that occurs in the first set of frames. For example, the content processing engine and/or one or more video processing modules at a remote server may determine, using a first neural network, a first action that occurs in the first set of frames. Actions or events may be determined based at least in part on objects that are present in video content and/or human poses or activities that occur during scenes across multiple frames. For example, an action and/or human pose detection module may be used to analyze the video and/or audio of the content in a frame-by-frame or segment-by-segment analysis to detect the presence or occurrence of human actions. Certain embodiments may include a facial recognition module that may be used to analyze video and/or audio of the content in a frame-by-frame or segment-by-segment analysis to detect the presence of characters in frames or scenes. The first neural network may be a two-dimensional convolutional neural network in some embodiments.

At block 230 of the process flow 200, computer-executable instructions stored on a memory of a device, such as a remote server or a user device, may be executed to determine a first sound present in the first audio content. For example, the content processing engine and/or one or more audio processing modules at a remote server may determine a first sound present in the first audio content. The first sound may be a human voice (e.g., a character speaking), sound effects, music, background noise, or other sounds. Sounds may be used to determine actions and/or events that occur during video segments, as well as to increase a confidence interval that a certain object is present in a frame (e.g., sounds from a car may make it more likely that a car is present in a frame, etc.).

At block 240 of the process flow 200, computer-executable instructions stored on a memory of a device, such as a remote server or a user device, may be executed to generate a vector representing the first action and the first sound. For example, the content processing engine and/or one or more neural networks at a remote server may generate a vector representing the first action and the first sound. For example, the vector may incorporate the data captured using the frame analysis and the sound analysis. In some embodiments, a single vector may be generated, whereas in other embodiments, more than one vector may be generated. The vector may incorporate the detected features for a video segment, or a set of multiple frames.

At block 250 of the process flow 200, computer-executable instructions stored on a memory of a device, such as a remote server or a user device, may be executed to generate, using a second neural network and the vector, a first textual description of the first segment, wherein the first textual description comprises words that describe events of the first segment. For example, a textual description generation engine at a remote server may generate, using a second neural network and the vector, a first textual description of the first segment, wherein the first textual description comprises words that describe events of the first segment. The vector may be input at the second neural network, and the corresponding textual description may be output. The textual description may be used for the video segment that may have a length of about 10 seconds. To generate the textual description, the second neural network may be a three-dimensional convolutional neural network, and may aggregate the individual textual descriptions of frames to determine an overall textual description for the video segment. For example, similar textual descriptions for adjacent frames may be consolidated using a set of rules. In particular, the second neural network may be used to generate a second textual description of a second segment of the video content, which may be compared to the first textual description. The remote server may determine that the second textual description is substantially the same as the first textual description, and may determine that the first textual description corresponds to both the first segment and the second segment of the video content. Textual descriptions may be output as text files.

In some embodiments, audio content associated with the content may be used in addition to, or instead of, text content to determine sentences that occur in a segment. For example, a remote server may analyze an audio file corresponding to a video. The audio file may include audible sounds, such as dialog, sound effects, soundtrack music, and the like corresponding to the video component of the video. For example, audio may be processed to extract dialog (e.g., filtered to remove sound effects, music, etc.), and the extracted dialog may be processed using speech-to-text processing algorithms. The output may be processed using natural language processing. In an example, an audio processing module may be used to determine the presence of dialog, sound effects, and other instances of audio events that may be used to determine themes of content in a segment. For example, the audio processing module may parse or segment audio associated with the content and identify events or instances of certain indicators or occurrences, such as ocean waves, fire trucks, ambulances, screams, and other audio that may be indicative of actions or events occurring during the segment.

In some embodiments, audio content may be segmented into one or more discrete portions for classification and/or analysis. For example, segments may be classified as music, dialog, sound effects, and so forth. Differently classified portions may be analyzed using different signal processing and/or speech-to-text profiles. In some embodiments, natural language processing may be used to determine a meaning of certain portions of audio. In one example, an audio processing algorithm may be used to determine presence of an explosion feature in the audio file.

At optional block 260 of the process flow 200, computer-executable instructions stored on a memory of a device, such as a remote server or a user device, may be executed to determine a revised version of the first textual description using one or more post-processing rules. For example, a textual description generation engine at a remote server may determine a revised version of the first textual description using one or more post-processing rules. Post-processing rules may include replacing pronouns with appropriate character names, correcting grammar, correcting syntax, providing context, and so forth. Post-processing rules may include modifications to the textual description using knowledge graph data and/or other inputs. In particular, the remote server may determine that the textual description comprises a pronoun, and may therefore determine, using a knowledge graph, a character name associated with a first voice in the audio and/or a certain face in the frame, and may cause the pronoun to be replaced with the character name.

In some embodiments, different neural networks may be used for analyzing frames, generating vectors, and generating textual descriptions. In other embodiments, the same neural networks may be used for one or more of these tasks.

At optional block 270 computer-executable instructions stored on a memory of a device, such as a remote server or a user device, may be executed to cause the first textual description to be presented as audio during playback of the first segment of the video content. For example, a textual description generation engine at a remote server may be configured to cause a playback device to present the first textual description in audio format. A user may therefore hear an audible rendering of the first textual description while consuming the video content.

Figure 3:
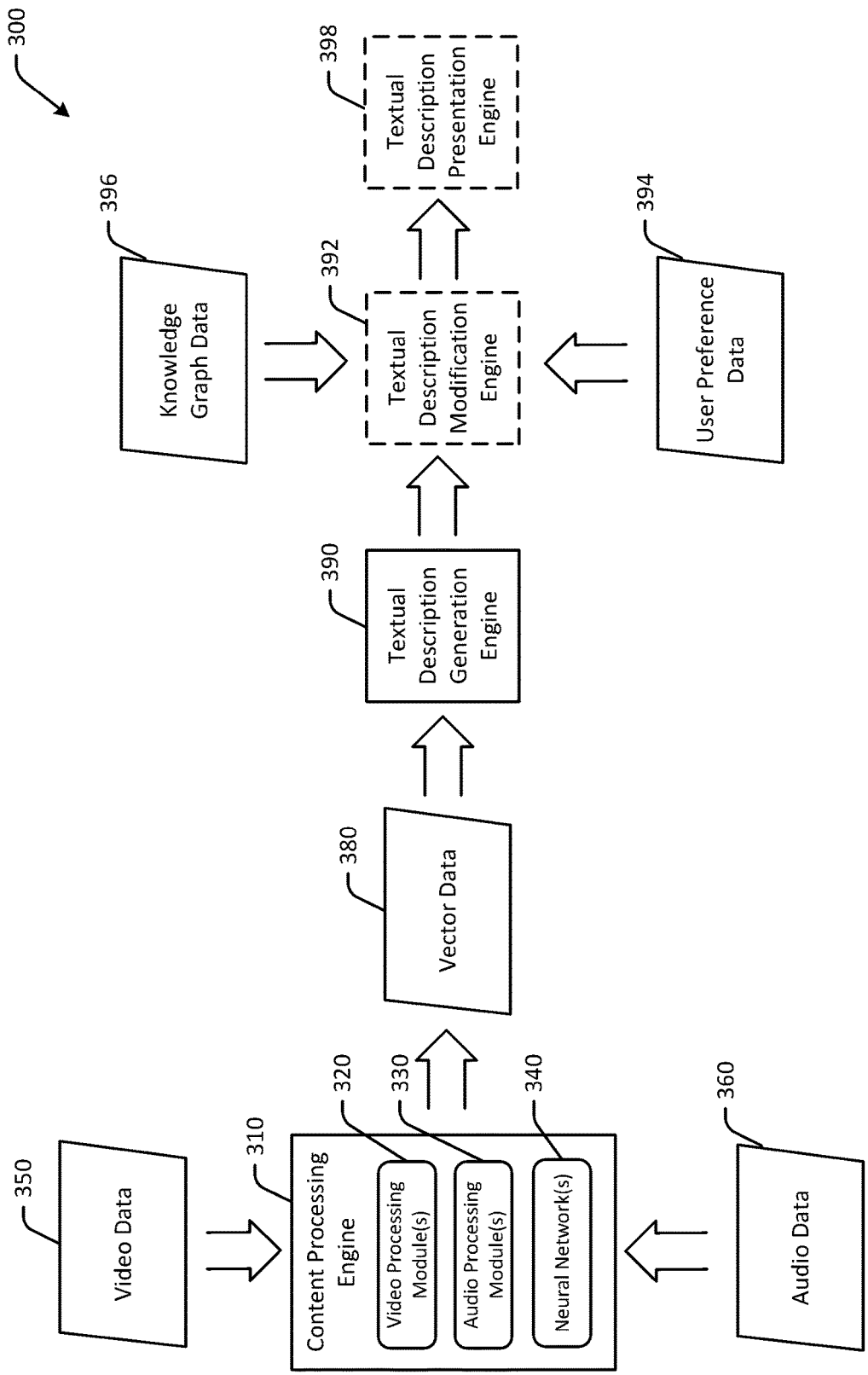
FIG. 3 is a schematic illustration of an example data flow for generating textual descriptions of video content in accordance with one or more example embodiments of the disclosure.

FIG. 3 is a schematic illustration of an example data flow 300 for generating textual descriptions of video content in accordance with one or more example embodiments of the disclosure. Different embodiments may include different, additional, or fewer inputs or outputs than those illustrated in the example of FIG. 3.

In FIG. 3, an example data flow 300 is schematically depicted. A content processing engine 310 and/or one or more content scanning module(s) may be configured to detect or determine one or more features present in digital content, such as audio, video, and/or text content. The content processing engine 310 may be stored at and/or executed by one or more remote servers. The content processing engine 310 may include one or more modules or algorithms, and may be configured to identify or determine the presence of one or more features in digital content.

For example, the content processing engine 310 may include one or more video processing modules 320, one or more audio processing modules 330, and/or one or more neural networks 340. Additional or fewer, or different, modules may be included. The video processing module(s) 320 may be configured to process and/or analyze video content. For example, the video processing module(s) 320 may be configured to determine frames or sets of frames of video content and may be configured to detect certain features, such as certain objects, as well as actions or events across multiple frames. For example, a video file for a movie may include a first frame, a second frame, and so forth. The video processing module(s) 320 may be configured to detect or analyze frames in video content to determine which frames correspond to the same scene. For example, the video processing module(s) 320 may include facial recognition and/or human pose detection algorithms that can be used to identify people or actions in certain locations over frames or segments of the video content, which may not always be consecutive. For example, a scene may be briefly interrupted by a flashback or cut to a different story, and may resume thereafter. Video processing module(s) 320 may include one or more object recognition algorithms configured to detect at least one of predefined objects, predefined scenery (e.g., certain locations, etc.), and the like.

The audio processing module(s) 330 may be configured to process and/or analyze audio content, such as audible dialog, sound effects, music, and other audio. In some instances, the audio processing module(s) 330 may be configured to convert audio to text and/or perform natural language processing to determine a meaning of certain portions of audio or its corresponding transcription. The audio processing module(s) 330 may be configured to detect features such as sound effects (e.g., gunshots, explosions, etc.), music, dialogue (e.g., presence of certain words or phrases, etc.), and/or other sound-based features. Audio processing module(s) 330 may include one or more algorithms configured to detect at least one of predefined expressions, predefined sounds, and the like.

The neural network(s) 340 may be configured to analyze and/or process frames and/or audio segments. The neural network(s) 340 may include a first neural network configured to generate textual descriptions of individual frames. The neural network(s) 340 may include a second neural network configured to generate vectors that represent frames and/or video segments.

The content processing engine 310 may receive one or more inputs for content for which textual descriptions are to be generated. For example, the content processing engine 310 may receive one or more of video data 350 associated with content for which textual descriptions are to be generated, and audio data 360 associated with content for which textual descriptions are to be generated. In some embodiments, the video data 350, audio data 360, and (optionally) text data may be extracted from a content file.

The content processing engine 310 may process the respective data associated with the content for which textual descriptions are to be generated. For example, the video data 350 may be processed using one or more of the video processing module(s) 320, the audio processing module(s) 330, and/or the neural network(s) 340. Likewise, the audio data 360 and/or the optional text data may be processed using one or more of the modules or algorithms of the content processing engine 310.

Using one or more algorithms or modules, the content processing engine 310 may determine the presence of one or more types of objects, faces, and/or scenes in the content, and may output vector data 380. The vector data 380 may include one or more vectors that represent the features of the frames that form a video segment. For example, a video segment of 10 seconds may have 30 frames, and features detected in some or all of the 30 frames may be aggregated and used to generate a vector that may be included in the vector data 380. Video content may include more than one vector for various video segments of the video content.

The vector data 380 may be input at a textual description generation engine 390 and/or one or more textual description generation module(s). The textual description generation engine 390 may be configured to generate textual descriptions for video segments using the vector data 380. For example, the textual description generation engine 390 may generate a first textual description using a first vector, and a second textual description using a second vector of the vector data 380. The textual description generation engine 390 may use one or more neural networks to generate textual descriptions.

In some embodiments, the textual description generation engine 390 may aggregate textual descriptions for individual frames in a video segment, and may consolidate the descriptions to generate a textual description that is applicable to the entire video segment. The textual description generation engine 390 may output a first version of a textual description using the vector data 380.

The textual description generation engine 390 may be in communication with an optional textual description modification engine 392. In some embodiments, the textual description modification engine 392 may be a part of, or integrated with, the textual description generation engine 390. The textual description modification engine 392 may be configured to modify the first version of the textual description output by the textual description generation engine 390. The textual description modification engine 392 may be configured to refine the first version of the textual description by using one or more post-processing rules. The textual description modification engine 392 may modify the first version by modifying the content of the description (e.g., replacing pronouns, etc.), changing a length of the description (e.g., changing the granularity based on available time, user settings, etc.), and the like. For example, the textual description modification engine 392 may determine user preference data 394. The user preference data 394 may be used by the textual description modification engine 392 to determine custom lengths and/or formats of the textual descriptions. The user preference data 394 may include information related to an active user profile or account, historical textual description settings (e.g., audible presentation selections, visual presentation selections, etc.), historically consumed content, historically viewed content and/or content summaries and resultant conversion information (e.g., whether the user viewed a content summary for content and then actually consumed the content, etc.), user content preference data, user content summary length preference data, and/or other preference data.

The textual description modification engine 392 and/or the textual description generation engine 390 may query the user preference data 394 to determine user preference data for an active user profile. In some embodiments, the textual description modification engine 392 and/or the textual description generation engine 390 may determine an active user profile and may automatically request user preference data for the user profile. Based at least in part on the user preference data 394 for the particular user, the textual description modification engine 392 and/or the textual description generation engine 390 may modify content and/or length of the first version of the textual description.

Figure 5:
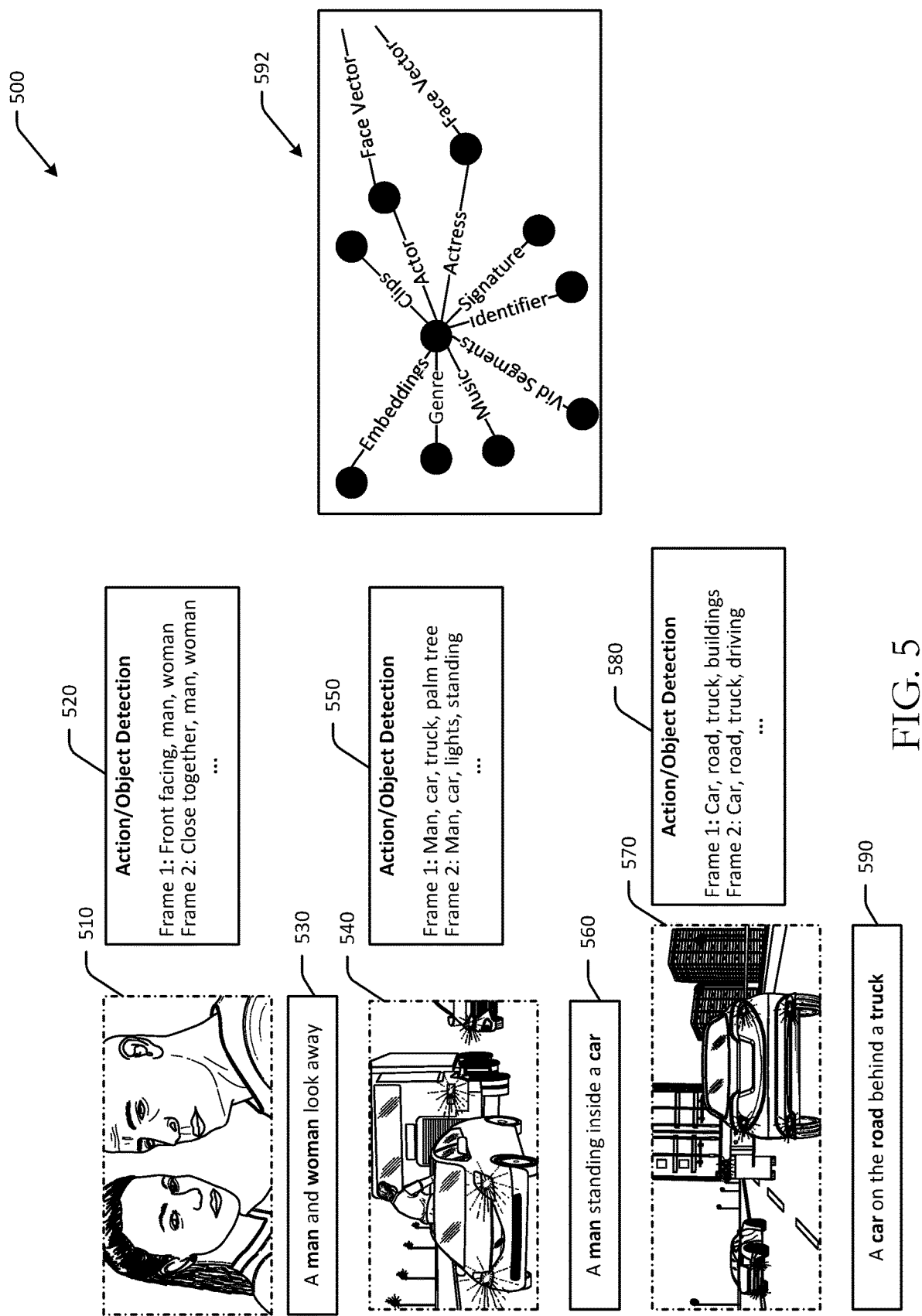
FIG. 5 is a schematic illustration of example action detection and knowledge graph data in accordance with one or more example embodiments of the disclosure.

The textual description modification engine 392 may be in communication with knowledge graph data 396. Knowledge graph data 396 may be used by the textual description modification engine 392 to customize the first version of the textual description with contextual information relevant to the video content. For example, the knowledge graph data 396 may include character/actor names, events that occur in the video content, locations in the content, and so forth. An example of knowledge graph data is illustrated in FIG. 5.

Using one or more of the user preference data 394 and the knowledge graph data 396, the textual description modification engine 392 may generate a second version of the textual description that is customized for the video content and that has been processed for grammar and/or syntax. For example, a first version of textual description may be "a woman blow drying hair" and a second version of the textual description may be "Lina is blow drying her hair while wearing a red shirt."

The textual description modification engine 392 may output the second version of the textual description to an optional textual description presentation engine 398. In some embodiments, the textual description presentation engine 398 may be a part of, or integrated into, the textual description generation engine 390. The textual description presentation engine 398 may be configured to generate audible and/or visual renderings of the respective textual descriptions for video content. For visual rendering, the textual description presentation engine 398 may determine a time at which to present textual descriptions (and a presentation time (e.g., how long to present for)) based at least in part on a time-text (subtitle) file. For audible rendering, the textual description presentation engine 398 may determine instances in the video content during which a sound level (a total amount of sound associated with a video segment) is equal to or below a threshold. Based at least in part on a length of time at which the sound level is equal to or below the threshold, the textual description presentation engine 398 may determine a playback speed of the audible rendering of the textual description. In some embodiments, the length of the textual description may be modified based at least in part on the available time (the time at which the sound level is at or below the threshold) in which to audibly present the textual description. Audible renderings may be presented as audio data overlaid on the audio data associated with the video content. In some embodiments, the audible rendering of the textual description may be merged with the audio data of the video content to generate new audio data, while in other embodiments, the audible rendering may be presented while pausing or interrupting the original audio data. In some instances, the audible rendering may be presented as an overlaid audio track over the original audio data. The textual description presentation engine 398 may send the textual description (in text or audio format (e.g., text-to-speech, etc.)) to a user device for presentation at a display to the user. Presentation of the content summary may be inline at a user interface already rendered at a display, as opposed to generating another user interface in some instances, while in other instances, content summaries may be presented at a different or redirected user interface.

Figure 4:
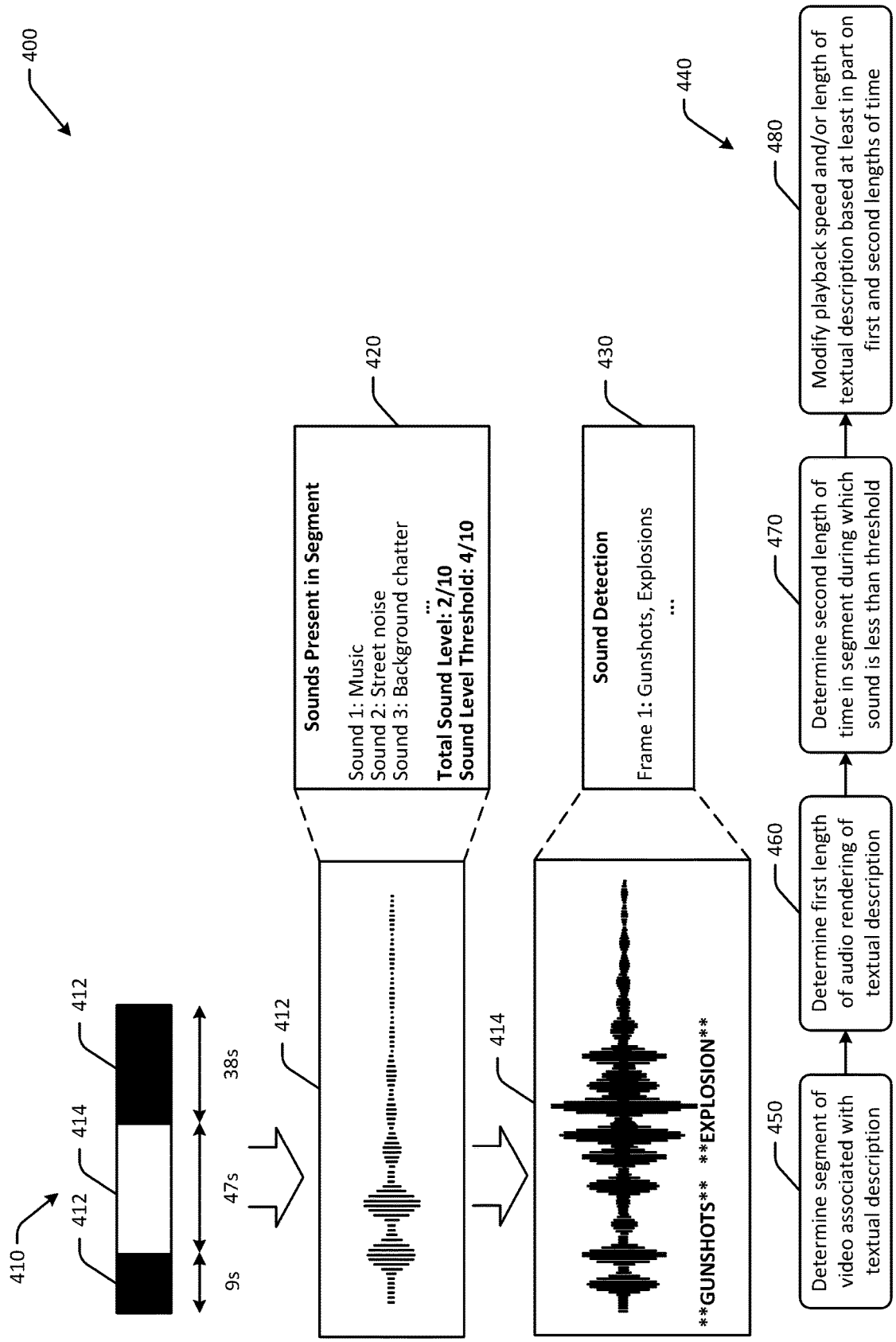
FIG. 4 is a schematic illustration of example sound detection and audible presentation of textual descriptions in accordance with one or more example embodiments of the disclosure.

FIG. 4 is a schematic illustration of an example use case 400 of sound detection and audible presentation of textual descriptions in accordance with one or more example embodiments of the disclosure. In FIG. 4, content 410 is represented in a bar format and may include a number of different segments. The content may be video content, such as a movie, television show, or other video content. Segments may correspond to certain scenes of the content 410 and may or may not be continuous, and may have different lengths. Segments may be identified using one or more timestamps. The segments of content 410 are illustrated in alternating black and white blocks for illustrative purposes only.

For example, the content 410 may include a first segment 412 having a length of 9 seconds and a subsequent length of 38 seconds. The first segment 412 may be interrupted or separated by a second segment 414 having a length of 47 seconds. The first segment 412 may therefore be associated with a first start timestamp of 0:00 and a first end timestamp of 0:09, as well as a second start timestamp of 0:56 and a second end timestamp of 1:34. The second segment 414 may be associated with a start timestamp of 0:09 and an end timestamp of 0:56. Timestamps may be determined for segments and/or events that occur in the content 410. For example, a first timestamp may be associated with a start of the first event, and a second timestamp may be associated with an end of the first event.

The remote server may process the respective frames and audio content of the segments using various image processing algorithms and/or audio processing algorithms. For example, for the first segment 412, the remote server may process the corresponding audio to determine sounds present in the segment 420. The output of the audio analysis may include detected sounds, such as music, street noise, and background chatter. The remote server may also determine a total sound level in the segment. The total sound level may represent an average amount of sound in the particular audio segment. An amount of sound may be determined using decibel levels, volume levels, mixer levels, or another suitable metric to determine sound present in the audio segment. The amount of sound may be converted to a scale in some embodiments. For example, in FIG. 4, the remote server may determine that the total sound level in the audio segment is 2 out of 10, where a rating of 10 may be a maximum. The total sound level may be compared to a sound level threshold. For example, the sound level threshold may be 4 out of 10, meaning that as long as the sound level in a segment has a rating of 4 or lower, audible presentation of textual descriptions is acceptable during the segment.

Audio detection may be used to determine dialog that occurs in a segment, actions or events that may occur during the segment, a tempo or pace of the segment, and/or the like. For example, a remote server or a user device may be used to analyze one or more portions of audio of a content file to determine whether instances of any predefined sounds, verbs, keywords, or other features are present. Predefined sounds may be certain objects such as firearms, explosions, moans, and so forth. Sounds may be determined to be present based at least in part on audio detection, voice processing, or other audio, text, image, or video processing algorithms. In some embodiments, individual portions of audio data may be analyzed to determine whether any predefined sounds are present. The audio processing algorithm may be configured to detect dialog, predefined sounds, and other audio-based features present in the audio. Audio processing may also be used to determine the occurrence of events, and/or to corroborate the occurrence of events. For example, cheering may be associated with a winning home run or basketball goal. In some embodiments, a remote server may determine, using one or more audio processing algorithms, an event that occurs in audio content, and may determine a theme of the corresponding scene or segment using the event.

In another example, the remote server may process audio associated with the second segment 414 to detect sounds, such as sound effects and so forth. In the example of FIG. 4, the audio may be determined to include gunshots and explosions. Such sound detection may be used in conjunction with image processing to determine events/actions and/or objects that appear in the corresponding video clip.

To determine placement and playback of audible rendering of textual descriptions, a remote server may execute an example process flow 440. For example, the remote server and/or computer system may include at least one memory that stores computer-executable instructions and at least one processor configured to access the at least one memory and execute the computer-executable instructions to perform various actions or operations, such as one or more of the operations in the process flow 440.

At block 450, a segment of video content associated with a textual description may be determined. For example, the remote server may determine the portion of the video content that corresponds to a certain textual description. In the example of FIG. 4, the textual description may correspond to the first segment 412.

At block 460, a first length of an audio rendering of the textual description may be determined. For example, the remote server may determine a length of an audio rendering of the textual description at a default playback speed. The audio rendering may be an audio file that was recorded by a human or may be automatically generated using text-to-speech functionality.

At block 470, a second length of time in the segment during which the sound level is less than a threshold may be determined. For example, the remote server may determine a continuous length of time in the first segment 412 during which the sound level is below the threshold (this may be a different determination than an average sound level).

At block 480, the playback speed and/or the length of the textual description may be modified based at least in part on the first and second lengths of time. For example, the remote server may determine whether the second length of time is greater than the first length of time. If so, no modification may need to be made. If the second length of time is less than the first length of time, the remote server may increase the playback speed of the audio rendering to fit within the second length of time. The adjustment to the playback speed may be limited. For example, adjustments may be limited to 20% increases. If such an increase is insufficient, the remote server may reduce the length of the textual description (or a length of the audio rendering) to match the second length of time.

For placement of the audio rendering, the remote server may select a portion of the segment in which the continuous length of time available for the audio presentation to be played in addition to, or instead of, the original audio content is sufficient. In some embodiments, the audio rendering of the text description may be presented at any time during a segment, whereas in other embodiments, the audio rendering of the text description may be presented within a certain time (e.g., 5 seconds, etc.) of the beginning of a segment. Modification of playback speed and/or audio rendering length may be a form of post-processing. The first textual description may be caused to be presented as audio during playback of the first segment of the video content.

In some instances, audio rendering may be presented during natural pauses or breaks in the audio content. Natural pauses may be portions of the audio content where sound levels are equal to or less than a threshold. For example, a remote server may determine a first length of time of the audio corresponding to the first textual description, and may determine a portion of the first audio content during which a sound level is equal to or less than a threshold. The remote server may determine that the first length of time is less than a second length of time of the portion. The remote server may therefore cause the first textual description to be presented as audio during playback of the portion of the first segment.

Granularity of textual descriptions may be adjusted based at least in part on user preferences and/or an amount of time in which the audio rendering can be presented. For example, a remote server may determine a desired granularity setting indicative of a total length of textual descriptions for the video content, and may adjust a length of the first textual description based at least in part on the desired granularity. Desired granularity may be selected in the form of "default," "detailed," or "light," or any other suitable selection options.

FIG. 5 is a schematic illustration of an example use case 500 of action detection and knowledge graph data in accordance with one or more example embodiments of the disclosure. While example embodiments of the disclosure may be described in the context of frames or images, it should be appreciated that the disclosure is more broadly applicable to any suitable portion of digital content.

Certain embodiments may use one or more action detection and/or object detection algorithms to process video frames and determine human actions that may occur during the frame or set of frames and/or objects that appear in frames. For example, in FIG. 5, a set of frames may be from the content 410 of FIG. 4 and may include a first set of frames 510, a second set of frames 540, and a third set of frames 570. One or more content processing engines and/or one or more content scanning modules at a remote server may be configured to process the respective frames using image recognition algorithms to determine human actions that occur during the frames. For example, the algorithms may be configured to extract actions and/or poses at certain frame intervals of content, such as frames at every 5 seconds of content. In the first set of frames 510, output 520 of the algorithm may indicate that a man and a woman are facing forward and looking away from each other at a first frame in the first set. In the second frame of the first set, the output may indicate that the man and the woman are closer to each other.

The output of the frame or the set of frames may be used to generate a first textual description 530 for the first set of frames 510, which may be "a man and woman look away," where "man" and "woman" may be replaced with character names during post-processing.

Human pose detection may include object detection, pattern recognition (e.g., human action image recognition, etc.), facial recognition (e.g., facial sentiment detection, etc.), or other image or video processing algorithms. In some embodiments, individual frames or sets of frames may be analyzed to determine whether human action is present.

In some instances, a remote server or a user device may be used to analyze one or more portions of video of a content file to determine whether instances of any predefined objects are present. Predefined objects may be certain objects such as firearms, explosions, needles, drugs, and so forth. Objects may be determined to be present based at least in part on object detection, or other audio, text, image, or video processing algorithms. In some embodiments, individual frames or sets of frames, or portions of text data or audio data, may be analyzed to determine whether any predefined objects are present. Object detection may be performed, in one example, by a remote server. For example, the remote server may determine, using one or more object recognition algorithms, a first object that is present in the first set of frames. The remote server may also determine, using one or more facial recognition algorithms, a gender of a first character that is present in the first set of frames, and may use the determined data to generate a vector representing the first action, as well as detected sounds, detected objects, detected people and/or genders, and so forth.

For the second set of frames 540, action/object detection output 550 may indicate that in a first frame, a man, a car, a truck, and a palm tree were detected. In a second frame, the man, the car, and lights were detected, along with an action of "standing." The remote server may generate a second textual description 560 of "a man standing inside a car" for the second set of frames 540.

For the third set of frames 570, action/object detection output 580 may indicate that in a first frame, a car, a road, a truck, and buildings were detected. In a second frame, the car, the road, and the truck were detected, along with an action of "driving." The remote server may generate a third textual description 590 of "a car on the road behind a truck" for the third set of frames 540.

The respective sets of frames may correspond to different video segments, and the respective textual descriptions may be presented visually, such as on a display in text format, and/or audibly, such as via a narrator voice, during playback of the respective video segments.

The textual descriptions may be associated with the video content and may enable search functionality based at least in part on searches of the textual description. For example, users may search for content by referencing scenes. In one example, a remote server may receive a search request for content that includes a certain scene. The scene may be described by words. The remote server may determine, using the textual descriptions of different video content, a set of search results (e.g., the remote server may determine that the first textual description corresponds to the scene ion the search request, etc.), and may determine the video content as a search result responsive to the search request. Search requests may include or be associated with a description of a scene that occurs in video content. A set of search results responsive to the search request may be generated, where the set of search results may include identifiers associated with different video content.

In addition, users may share textual descriptions using messages. For example, a user may send any textual description to another user, and may include a link to the corresponding video segment. The remote server may therefore generate a message that includes the first textual description, and may cause the message to be sent to a user account.

FIG. 5 depicts an example knowledge graph 592 that may be used to refine textual descriptions. Knowledge graph 592 may include knowledge graph data, such as semantic knowledge, metadata, people, content, auto generated content, information, and so forth. In the example of FIG. 5, relationships between content genres, music, video segments, embedded content, identifiers, signatures, actresses, actors, clips, facial vectors, and so forth are illustrated. Such data may be used to determine actions, events, character names, locations, and/or other features that occur in video content.

One or more operations of the methods, process flows, or use cases of FIGS. 1-5 may have been described above as being performed by a user device, or more specifically, by one or more program module(s), applications, or the like executing on a device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 6:
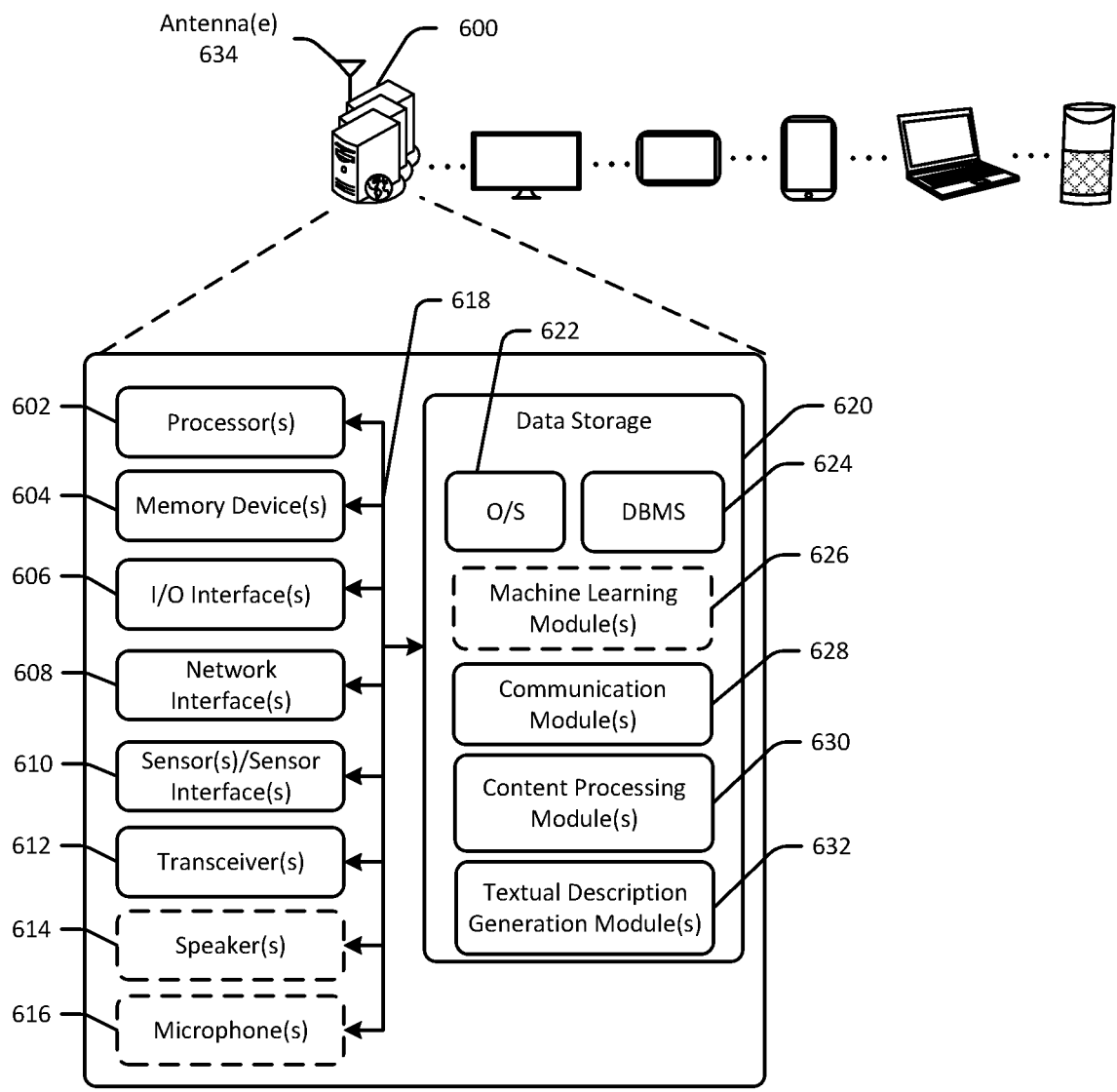
FIG. 6 is a schematic block diagram of an illustrative device in accordance with one or more example embodiments of the disclosure.

FIG. 6 is a schematic block diagram of an illustrative remote server 600 in accordance with one or more example embodiments of the disclosure. The remote server 600 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The remote server 600 may correspond to an illustrative device configuration for the devices of FIGS. 1-5.

The remote server 600 may be configured to communicate via one or more networks with one or more servers, search engines, user devices, or the like. In some embodiments, a single remote server or single group of remote servers may be configured to perform more than one type of textual description generation and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 600 may include one or more processors (processor(s)) 602, one or more memory devices 604 (generically referred to herein as memory 604), one or more input/output (I/O) interface(s) 606, one or more network interface(s) 608, one or more sensors or sensor interface(s) 610, one or more transceivers 612, one or more optional speakers 614, one or more optional microphones 616, and data storage 620. The remote server 600 may further include one or more buses 618 that functionally couple various components of the remote server 600. The remote server 600 may further include one or more antenna(e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the remote server 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the remote server 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more optional machine learning module(s) 626, one or more communication module(s) 628, one or more content processing module(s) 630, and/or one or more textual description generation module(s) 632. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the remote server 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, granularity preference information, user action information, historical content consumption information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the remote server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the optional machine learning module(s) 626 may include computer-executable instructions, code, or the like that responsive to execution by one or more of the processor(s) 602 may perform functions including, but not limited to, determining textual description data, combining similar textual descriptions, determining or detecting actions and/events, generating one or more machine learning models or algorithms, determining or classifying sounds or voices, determining frames of content, and the like.

The communication module(s) 628 may include computer-executable instructions, code, or the like that responsive to execution by one or more of the processor(s) 602 may perform functions including, but not limited to, communicating with one or more devices, for example, via wired or wireless communication, communicating with remote servers, communicating with remote datastores, sending or receiving notifications or commands/directives, communicating with cache memory data, communicating with user devices, and the like.

The content processing module(s) 630 may include computer-executable instructions, code, or the like that responsive to execution by one or more of the processor(s) 602 may perform functions including, but not limited to, analyzing digital content, extracting frames, determining pixel color values, determining audio content, determining or analyzing audio files, identifying certain portions of content, extracting segments of content, and the like.

The textual description generation module(s) 632 may include computer-executable instructions, code, or the like that responsive to execution by one or more of the processor(s) 602 may perform functions including, but not limited to, determining textual descriptions, combining textual descriptions, generating audio files corresponding to textual descriptions, generating textual descriptions, modifying playback or presentation speed, determining messages, generating search results, and the like.

Referring now to other illustrative components depicted as being stored in the data storage 620, the O/S 622 may be loaded from the data storage 620 into the memory 604 and may provide an interface between other application software executing on the remote server 600 and hardware resources of the remote server 600. More specifically, the O/S 622 may include a set of computer-executable instructions for managing hardware resources of the remote server 600 and for providing common services to other application programs (e.g., managing memory allocation among various application programs). In certain example embodiments, the O/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 600 is a mobile device, the DBMS 624 may be any suitable light-weight DBMS optimized for performance on a mobile device.

Referring now to other illustrative components of the remote server 600, the input/output (I/O) interface(s) 606 may facilitate the receipt of input information by the remote server 600 from one or more I/O devices as well as the output of information from the remote server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 600 may further include one or more network interface(s) 608 via which the remote server 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna (e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum.

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the remote server 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the remote server 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 614 may be any device configured to generate audible sound. The optional microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the remote server 600 may include alternate and/or additional hardware, software, or firmware components beyond those described or depicted without departing from the scope of the disclosure. More particularly, it should be appreciated that software, firmware, or hardware components depicted as forming part of the remote server 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
    determining, by one or more computer processors coupled to memory, a first segment of video content, the first segment comprising a first set of frames and first audio content;
    determining, using a first neural network, a first action that occurs in the first set of frames;
    determining a first sound present in the first audio content;
    generating a vector representing the first action and the first sound;
    generating, using a second neural network and the vector, a first textual description of the first segment, wherein the first textual description comprises words that describe events of the first segment;
    determining a first length of time of the audio corresponding to the first textual description;
    determining a portion of the first audio content during which a sound level is equal to or less than a threshold;
    determining that the first length of time is less than a second length of time of the portion; and
    causing the first textual description to be presented as audio during playback of the portion of the first segment.

2. The method of claim 1, further comprising:
    determining a portion of the first audio content during which a sound level is equal to or less than a threshold; and
    modifying a playback speed of the first textual description based at least in part on a length of time of the portion.

3. The method of claim 1, further comprising:
    determining, using one or more object recognition algorithms, a first object that is present in the first set of frames; and
    determining, using one or more facial recognition algorithms, a gender of a first character that is present in the first set of frames;
    wherein generating the vector representing the first action and the first sound comprises generating the vector representing the first action, the first sound, the first object, and the gender.

4. The method of claim 3, further comprising:
    determining, using the second neural network and a knowledge graph, a character name associated with the first character;
    determining that a word associated with the gender is present in the first textual description; and
    causing the word to be replaced with the character name in the first textual description.

5. The method of claim 1, further comprising:
    modifying the first textual description to replace pronouns with character names.

6. The method of claim 1, further comprising:
    generating, using the second neural network, a second textual description of a second segment of the video content;
    determining that the second textual description is substantially the same as the first textual description; and
    determining that the first textual description corresponds to both the first segment and the second segment of the video content.

7. The method of claim 1, further comprising:
receiving a search request for content comprising a scene;
determining that the first textual description corresponds to the scene; and
determining the video content as a search result responsive to the search request.

8. The method of claim 1, further comprising:
determining a desired granularity setting indicative of a total length of textual descriptions for the video content; and
adjusting a length of the first textual description based at least in part on the desired granularity.

9. The method of claim 1, further comprising:
generating a message comprising the first textual description; and
causing the message to be sent to a user account.

10. The method of claim 1, wherein the first neural network is a two-dimensional convolutional neural network, and the second neural network is a three-dimensional convolutional neural network.

11. A system comprising:
memory configured to store computer-executable instructions; and
at least one computer processor configured to access the memory and execute the computer-executable instructions to:
determine a first segment of video content, the first segment comprising a first set of frames and first audio content;
determine, using a first neural network, a first action that occurs in the first set of frames;
determine a first sound present in the first audio content;
generate a vector representing the first action and the first sound; and
generate, using a second neural network and the vector, a first textual description of the first segment, wherein the first textual description comprises words that describe events of the first segment;
determine a first length of time of the audio corresponding to the first textual description;
determine a portion of the first audio content during which a sound level is equal to or less than a threshold;
determine that the first length of time is less than a second length of time of the portion; and
cause the first textual description to be presented as audio during playback of the portion of the first segment.

12. The system of claim 11, wherein the at least one processor is further configured to access the memory and execute the computer-executable instructions to:
determine a portion of the first audio content during which a sound level is equal to or less than a threshold; and
modify a playback speed of the first textual description based at least in part on a length of time of the portion.

13. The system of claim 11, wherein the at least one processor is further configured to access the memory and execute the computer-executable instructions to:
generate a message comprising the first textual description; and
cause the message to be sent to a user account.

14. The system of claim 11, wherein the at least one processor is further configured to access the memory and execute the computer-executable instructions to:
modify the first textual description to replace pronouns with character names.

15. The system of claim 11, wherein the at least one processor is further configured to access the memory and execute the computer-executable instructions to:
receive a search request for content comprising a scene;
determine that the first textual description corresponds to the scene; and
determine the video content as a search result responsive to the search request.

16. The system of claim 11, wherein the at least one processor is further configured to access the memory and execute the computer-executable instructions to:
determine a desired granularity setting indicative of a total length of textual descriptions for the video content; and
adjust a length of the first textual description based at least in part on the desired granularity.

17. The system of claim 11, wherein the first neural network is a two-dimensional convolutional neural network, and the second neural network is a three-dimensional convolutional neural network.

* * * * *